Sept. 22, 1942.   D. A. WALLACE   2,296,657
SURFACE TESTING APPARATUS
Filed Dec. 21, 1940   3 Sheets-Sheet 3
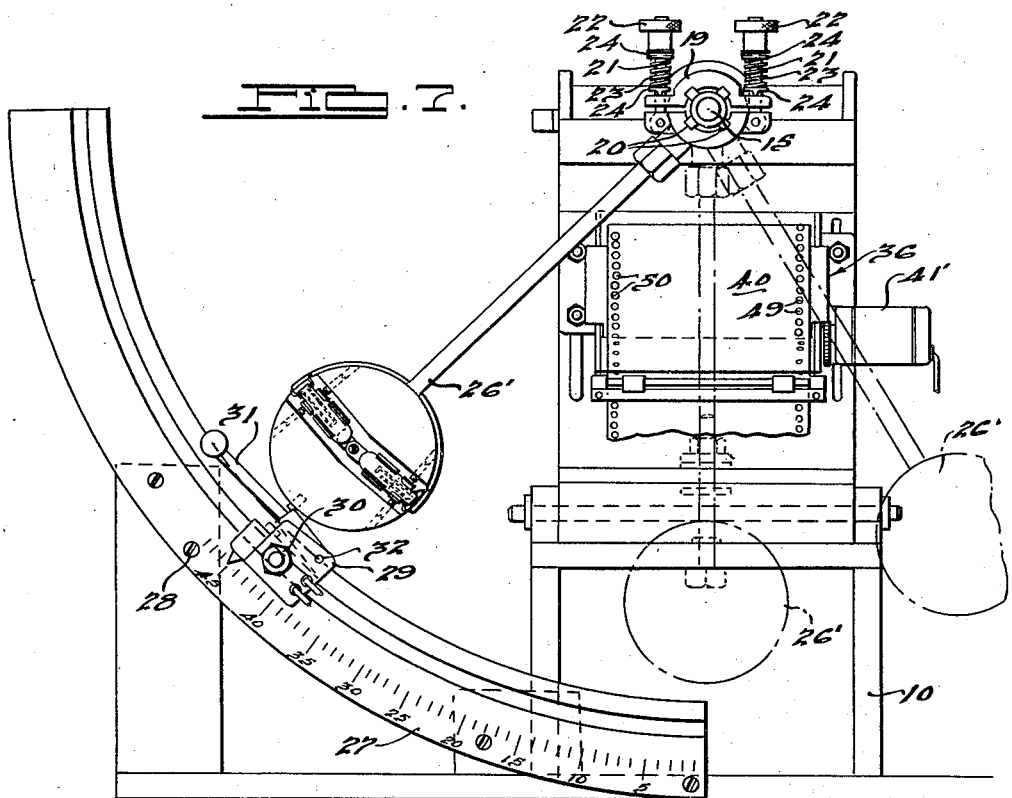
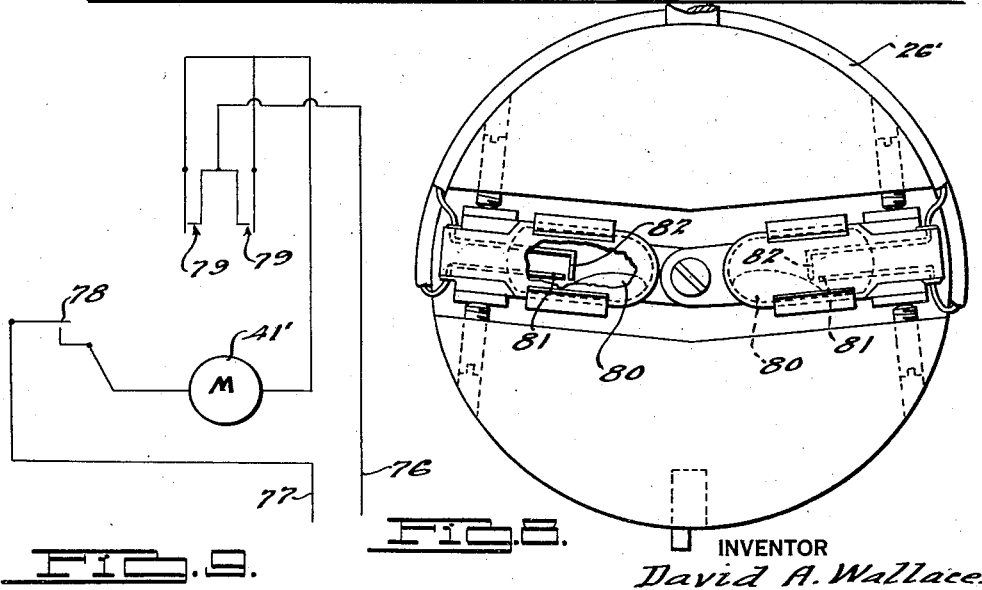
INVENTOR
David A. Wallace.
BY
ATTORNEYS.

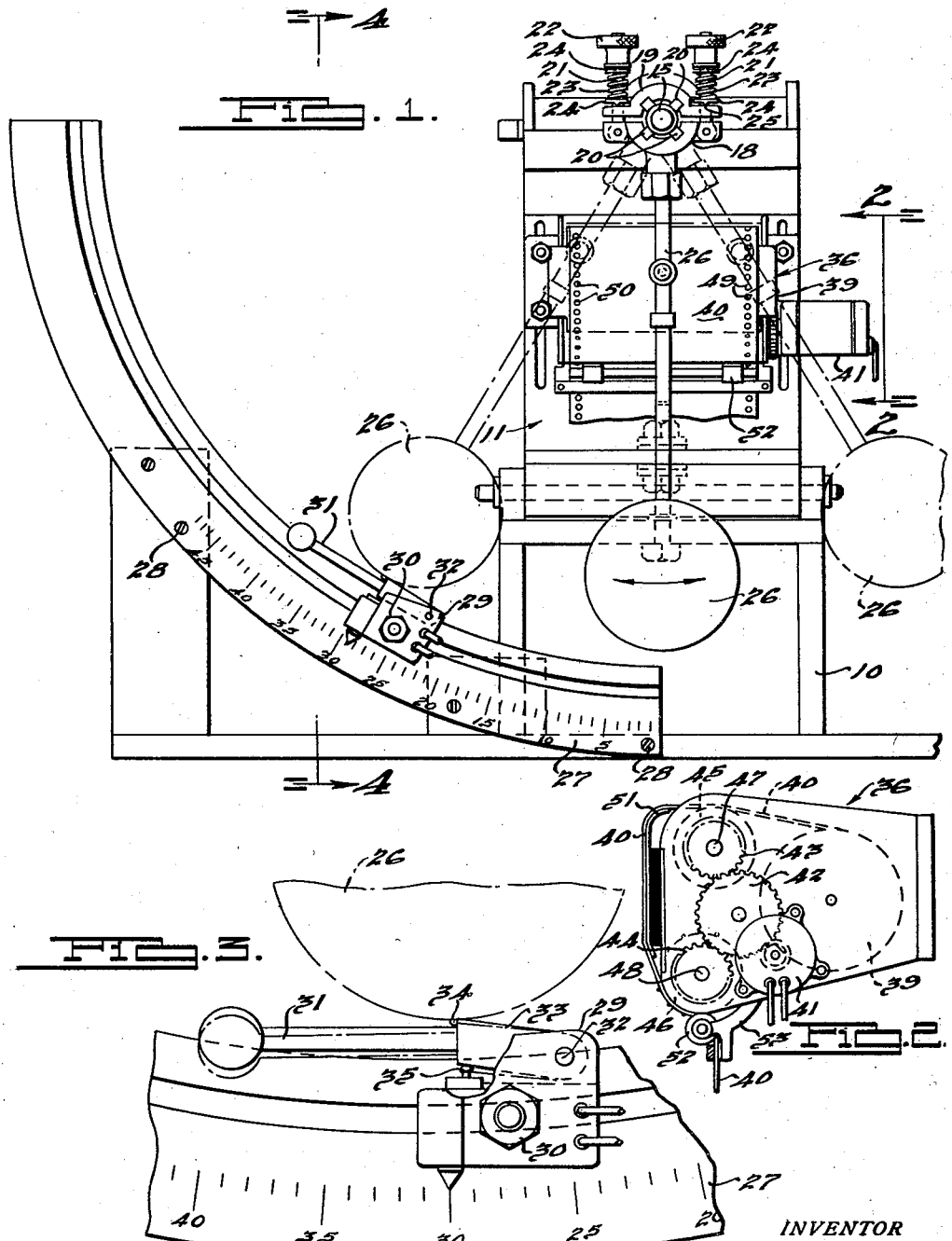

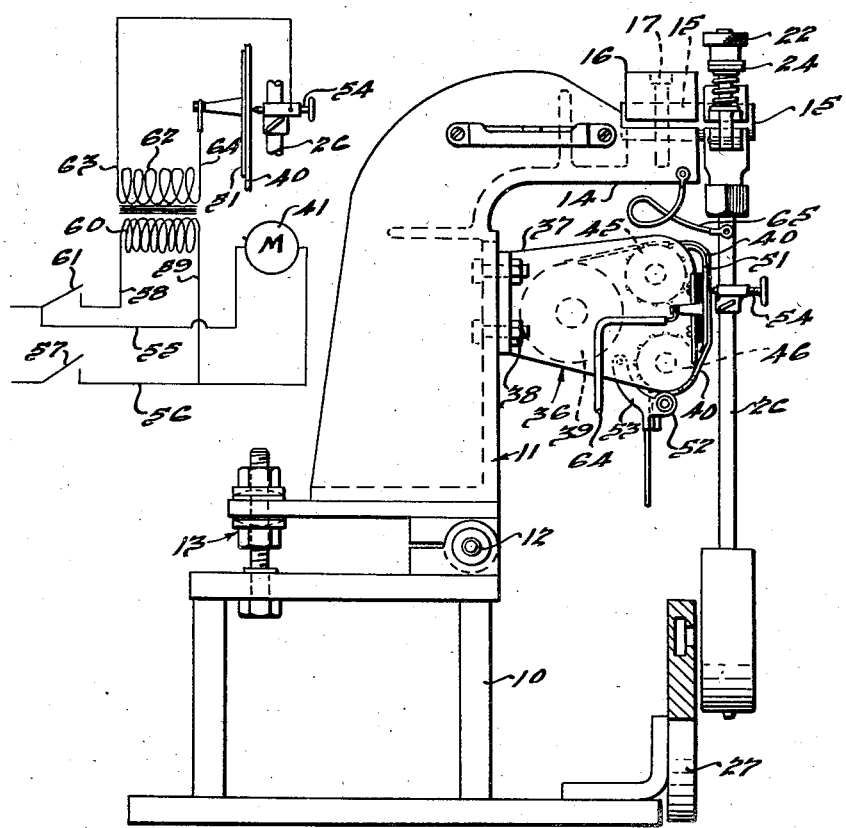

Patented Sept. 22, 1942

2,296,657

UNITED STATES PATENT OFFICE 2,296,657

SURFACE TESTING APPARATUS

David A. Wallace, Detroit, Mich., assignor to Chrysler Corporation, Highland Park, Mich., a corporation of Delaware Application December 21, 1940, Serial No. 371,083

9 Claims. (Cl. 265—10)

This invention relates to apparatus for measuring the smoothness of a surface and more particularly to measure the degree of quality of a finished surface.

An object of the invention is to provide apparatus which will accurately measure the smoothness characteristics of a surface and record these characteristics in a manner for easy and ready interpretation.

Another object of the invention is the provision of apparatus of this type which duplicates to a certain extent the actual conditions under which the surface to be tested will actually operate, and to effect this without the introduction of unknown variables such as those usually present during actual use. In this manner a true comparison may be had between different surface finishes because the conditions under which surfaces are tested are identical.

A still further object of the invention is the provision of improved means for recording the test results wherein the influence of friction is minimized if not entirely eliminated.

A further object of the invention is the provision of improved means for coordinating the operation of the testing and recording means whereby the same are operated in timely relationship.

Other objects and advantages of the invention will be more apparent from the following description taken in connection with the accompanying drawings in which:

Fig. 1 is a front elevational view of an apparatus embodying the invention.

Fig. 2 is a side elevational view taken as indicated by the line 2—2 of Fig. 1, illustrating the recording apparatus.

Fig. 3 is an enlarged fragmentary view illustrating the associated calibrated member and pendulum stop.

Fig. 4 is a side elevational view taken as indicated by the line 4—4 of Fig. 1.

Fig. 5 is a view illustrating a wiring diagram for the apparatus.

Fig. 6 is a fragmentary sectional view illustrating a modified form of head adapted to be used in testing bearing races and similar articles.

Fig. 7 is a view similar to Fig. 1 but showing a modified form of the apparatus.

Fig. 8 is an enlarged side elevational view illustrating the control switch shown in Fig. 7.

Fig. 9 is a view illustrating a wiring diagram for the apparatus shown in Fig. 7.

Referring to the drawings, the apparatus includes a base 10 and a work supporting head, generally indicated by the numeral 11, which is pivotally secured at 12 to the base 10 for adjustment about a horizontal axis through manipulation of the nut and bolt assembly indicated at 13, this assembly retaining the head in fixed position of adjustment. The head 11 has an overhanging part 14 provided with a groove therein adapted to receive a piece of work 15, a surface of which is to be tested.

The part 15 is retained in fixed position with respect to the head by a clamping cap 16, having a groove therein receiving the part 15 and which is secured to the head by cap screws, one of which is shown at 17. Inasmuch as the part 15, illustrated in Figs. 1 to 5, inclusive, is a piston wrist pin cylindrical in cross section, the grooves of the head and cap are correspondingly shaped, the cap being drawn by the screws 17 against the surface of part 15 to retain the latter against rotation relative to the head and cap.

The part 15 is received in a bearing including the lower bearing member 18 and the upper member or cap 19, each of these members being semi-cylindrical in cross-section and having a pair of axially extending slots in the inner surface thereof. Disposed in each of these slots is a bearing sleeve member 20 having a predetermined, fixed frictional coefficient bearing surface, arcuate contour, adapted to act on the outer surface of the piston wrist pin part 15. The bearing members 18 and 19 are connected by a pair of opposed pins 21 each pivotally connected to the member 18 and extending through open slots in the adjacent portions of the member 19, each pin having a nut 22 threaded on the upper end portion thereof. Interposed between each nut 22 and the upper surface of the member 19 is a coil spring 23 surrounding an associated pin 21 and acting against opposed seats 24 each provided with a pair of opposed protuberances, one of which is shown at 25. In the illustrated assembled operating position the springs 23 apply a load of known, predetermined value. Thus there are provided the shoes 20 having predetermined surface smoothness characteristics which operate on the surface to be tested under spring pressure of predetermined load.

In removing the part 15, the pins 21 are related away from the main body of the member 19 through the open end of the associated slot to permit separation of the members 18 and 19, without movement of the nut members 22 relative to the associated pin so that when the parts are again brought in assembled relation there will be uniform spring load.

In order to move the bearing members 18, 19 and shoes carried thereby relative to the piece of work 15, a pendulum 26 is secured to the part 18 and during swinging movement thereof effects the aforesaid relative movement and applies a definite rubbing load to the surface of the part 15. The amount or rate at which pendulum movement is retarded is indicative of conditions of that surface of the part 15 which is to be used as a bearing surface.

The pendulum is illustrated in its normal vertical position and is adapted to be moved therefrom to a definite starting position, which is a definite number of degrees from the vertical, and then released for swinging movement through arcs of varying degree with a constant decreasing amplitude. It will be understood that for the highest quality surfaces in which the least friction occurs the pendulum will swing a longer duration of time than if the friction is excessive.

With the foregoing in mind there is provided a member 27 calibrated in degrees, the calibrated portion extending from a point at the vertical position of the pendulum arcuately therefrom, and being suitably secured to the base 10 as at 28. Slidably mounted on the member 27 is a stop 29 having the nut and bolt assembly 30 by which it is releasably fixed in position relative to the member 27, the latter having a slot as illustrated in Fig. 4 accommodating a portion of the assembly. The member 27 has a lever pivoted thereto as at 32, the lever including a catch or sear 33, the end face of which engages a protuberance 34 of the pendulum for releasably retaining the latter in a starting position 30 degrees from the vertical. It will be understood that this starting position can be varied as the conditions of the work acted upon by the apparatus may vary.

When it is desired to release the pendulum for swinging movement the lever is moved anticlockwise as viewed in Figs. 1 and 3, thereby separating the catch 33 and protuberance 34. The weight of the lever 3i is sufficient to cause the catch 33 to depress a spring pressed switch operating stem 35 and maintain the switch associated therewith closed by which an electrical circuit is completed for energization of an electric motor, the latter operating the recording mechanism, generally indicated by the numeral 36.

The mechanism 36 is supported by frame work 37 secured at 38 to the head 11, and includes a rotatably mounted spool 39 having a suitable tape 40, such as paper, wound thereon. An electric motor 41 drives a pinion 42 which meshes with gear teeth 43 and 44 of toothed sprocket wheels 45 and 46 respectively, the teeth of the wheels 45 and 46 are received in perforations 49 at the adjacent edge of the tape 40, it being understood that wheels corresponding to those shown at 45 and 46 are secured respectively to opposite ends of the shifts and are received in perforations 50 at the adjacent edge of the tape 40. By this arrangement the tape is unwound from the spool 39 during energization of the motor 41. As the tape 40 is unwound it passes downwardly from the wheels 45 across a metallic plate 51 electrically insulated from the body of the apparatus, to the wheels 46, over an idler 52 and through a slot in an arm 53 carried by the frame 37.

The swinging movement of the pendulum 26 is recorded on the tape 40 as the latter passes over the metallic plate 51 and for this purpose the pendulum carries a stylus 54 which can be axially adjusted by reason of its threaded engagement with the pendulum to vary the spacing of the end portion of the stylus from the adjacent surface of the tape 40. As will hereinafter appear, the stylus is included in the electrical circuit and the swinging movement of the pendulum is recorded on the tape by passing electrical spark between the stylus and plate 51 through the tape to thinly create a marking on the latter. While there is provided a high frequency current to the stylus 54, the tape 40 may have embedded therein a conductive material.

Referring to Fig. 5, there are shown suitable lead in conductors 55 and 56 to the motor 41. A switch at 57 is operated by the stem 35 so that when the pendulum 26 is released for swinging movement the switch is closed. The wiring diagram further includes the connectors 58 and 59 to the primary coil 60 of the transformer, operation of the connector 58 being controlled by a manually operable switch at 61. The secondary coil 62 has the connectors leading 63 and 64 to the stylus 54 and the plate 51 respectively. As shown in Fig. 4 an electrical connection 65 is provided between the head 11 and pendulum 26.

Referring to Fig. 6, the work to be tested is illustrated as a roller bearing unit and is supported by a rod 66 retained between the parts 14 and 16. A pair of bearing units are received by the rod 66 between the bearing members 18 and 19 and the latter is secured together by a pair of screws, one of which is shown at 67. Each bearing unit includes the inner and outer races 68 and 69 respectively and the intermediate tapered rollers 70. The inner race of the unit at the left in Fig. 6 abuts a shoulder 71 which overlaps the end faces of the parts 14 and 16, and the outer races 69 are spaced by an inner annular rib 72 provided by the members 18 and 19. A coil spring 73 abuts the outer face of the right hand race 68 and is maintained under a predetermined load by a nut 74. In order to readily maintain this predetermined load for tests, the rod is provided with a shoulder (not shown) against which the washer 75 abuts to limit compression of the spring 73. The spring maintains the load substantially constant on the bearing surfaces, urging the adjacent unit axially of the rod 66, by reason of the tapered contacting surfaces, against the rib 72, and the latter acting on the outer race of the other unit urges the same axially so that the inner race of the unit abuts the shoulder 71.

In testing, a master race member or a master bearing member having a predetermined fixed frictional coefficient bearing surface is utilized. For example, should it be desired to determine the smoothness surface characteristics of the bearing member, then each of the race members utilized would have the aforesaid predetermined fixed frictional coefficient surface, and if the surface of a race member is to be tested, then the other race member and the bearing members utilized would be master parts each having a known bearing surface of the foregoing characteristic.

Referring to Figs. 7, 8 and 9, there is illustrated a modified form of the recording mechanism and control therefor wherein this mechanism ejects a strip of tape during swinging movement of the pendulum, the recording mechanism being set in operation upon release of the pendulum and automatically discontinued at cessation of pendulum movement. In this manner the length of tape ejected by the recording mechanism is indicative of the duration of pendulum movement for a given test operation. Otherwise the apparatus is similar to that of Fig. 1 and like parts have been so identified.

Referring to Fig. 9, the electric circuit includes the connectors 76 and 77, the switch indicated at 78, and the pair of switches generally indicated at 79 which are carried by the pendulum 26'. The switch 78 is similar to the switch at 57 for the Fig. 1 embodiment and operation thereof is controlled in a similar manner so that when the pendulum is released for swinging movement, the switch 78 is closed. When either of the pair of switches 79 is closed, the circuit to the motor 41' is completed and the recording mechanism is operative. Referring to Fig. 8, each switch 79 is closed by a body of mercury 80, the latter bridging the parts 81 and 82 during swinging movement of the pendulum so that upon release of the latter from its Fig. 7 position the switch 78 is closed and the motor 41 energized. Upon cessation of swinging movement the pendulum assumes the vertical position as indicated by dotted lines in Fig. 7, whereupon each of the switches 79 is opened and the circuit to the motor 41 is interrupted. In this manner the recording mechanism is set in operation upon release of the pendulum from a predetermined starting position and ejects tape only during pendulum operation so that the length of tape ejected during a given test is indicative of pendulum operation.

The apparatus embodied in each of the various forms not only measures and records surface quality but also provides a means for definitely measuring friction by the length of time it takes for the pendulum to cease movement from an arbitrary amplitude to zero amplitude.

I claim:

1. In a surface testing apparatus, a part having a surface to be tested, a second part having a surface of predetermined smoothness characteristics adapted to operate on the surface to be tested, means supporting said parts whereby oscillatory movement of one thereof is accommodated relative to the other thereof, a pendulum operatively connected with said one part adapted to be moved to a selected position and to be released therefrom to effect oscillatory movement of said one part relative to said other part, mechanism operable to record the operation of said pendulum and means operable incident to release of said pendulum from said selected position for effecting operation of said mechanism, said mechanism including a movable tape and tape-moving means operable during movement of the pendulum as aforesaid.

2. In a surface testing apparatus, a part having a surface to be tested, a second part having a surface of predetermined smoothness characteristics adapted to operate on the surface to be tested, means supporting said parts whereby oscillatory movement of one thereof is accommodated relative to the other thereof, a pendulum operatively connected with said one part adapted to be moved to a selected position and to be released therefrom to effect oscillatory movement of said one part relative to said other part, mechanism operable to record the operation of said pendulum, means operable incident to release of said pendulum from said selected position for effecting operation of said mechanism, said mechanism including a movable tape, tape-moving means operable during movement of the pendulum as aforesaid, and a stylus carried by said pendulum for indicating operation of the latter on said tape.

3. In a surface testing apparatus, a part having a surface to be tested, a second part having a surface of predetermined smoothness characteristics adapted to operate on the surface to be tested, oscillatory support means for one of said parts and support means for the other of said parts retaining the latter against oscillatory movement, a pendulum operatively connected with said oscillatory support means and swingable to a selected position, a calibrated member, a stop selectively positionable relative to said member and engageable with said pendulum for releasably retaining the latter in said selected position, mechanism operable to record the operation of said pendulum including a movable tape and tape-moving means, and means operable incident to release of said pendulum from said stop for effecting operation of said tape-moving means.

4. In a surface testing apparatus, a part having a surface to be tested, a second part supported for oscillatory movement relative to the first mentioned part and having a surface of predetermined smoothness characteristics adapted to operate on the surface to be tested, a pendulum operatively connected with said second part and operable to effect relative movement between said parts, a calibrated member, a stop selectively positionable relative to said member and engageable with said pendulum for releasably retaining the latter in a selected position of extreme movement, electrically actuated mechanism operable to record the operation of said pendulum including a movable tape and an electrically charged stylus carried by the pendulum operating on the tape, and switch means operable incident to release of said pendulum from said stop for effecting operation of said mechanism.

5. In a surface testing apparatus, a part having a surface to be tested, a second part having a surface of predetermined smoothness characteristics adapted to operate on the surface to be tested, means supporting said parts for relative oscillatory movement, a pendulum connected with one of said parts operable to effect relative movement between said parts, a calibrated member, a stop selectively positionable relative to said member and engageable with said pendulum for releasably retaining the latter in a selected position of extreme movement, electrically actuated mechanism operable to record the operation of said pendulum, and switch means operable incident to release of said pendulum from said stop for initiating operation of said mechanism, said mechanism including a reel having a roll of tape thereon and operable to release a strip of the tape during operation of said pendulum, said switch means being so constructed and arranged as to release said mechanism from its recording operation incident to stoppage of pendulum operation.

6. In a surface testing apparatus, a part having a surface to be tested, a second part having a surface of predetermined smoothness characteristics adapted to operate on the surface to be tested, means supporting said parts for relative oscillatory movement, a pendulum connected with one of said parts operable to effect relative movement between said parts and said surfaces, a calibrated member, a stop selectively positionable relative to said member and engageable with said pendulum for releasably retaining the latter in a selected position of extreme movement, electrically actuated mechanism operable to record the operation of said pendulum, switch means operable incident to release of said pendulum from said stop for effecting operation of said mechanism, said mechanism including a reel having a roll of tape thereon and operable to release a strip of the tape during operation of said pendulum, and electrically charged means carried by said pendulum for scoring the tape during operation of the pendulum and mechanism.

7. In a surface testing apparatus, a part having a surface to be tested, a second part having a surface of predetermined smoothness characteristics adapted to operate on the surface to be tested, oscillatory support means for one of said parts and support means for the other of said parts retaining the latter against oscillatory movement, a pendulum operatively connected with said one part adapted to be moved to a selected position and to be released therefrom to effect relative movement between said parts, electrically actuated mechanism operable to record operation of the pendulum, said mechanism including a roll of tape and means for discharging a portion of the latter during operation of the mechanism, means carried by said pendulum for indicating operation of the latter on said tape, switch means operable incident to release of the pendulum from its selected position for effecting operation of said mechanism and said tape discharging means, and other switch means operable upon cessation of operation of the pendulum, for rendering said mechanism and said tape discharging means inoperative.

8. In a surface testing apparatus, a member having a surface to be tested, a second member having a surface of predetermined smoothness characteristics adapted to operate on the surface to be tested, oscillatory support means for one of said members and relatively fixed support means for the other of said members, a pendulum operatively connected with said oscillatory support means, mechanism operable to record the operation of said pendulum, said mechanism including a reel having a roll of tape thereon adapted for rotation for unwinding of the tape during operation of the mechanism, and means controlling operation of said mechanism in timed relationship to operation of said pendulum.

9. In a surface testing apparatus, a member having a surface to be tested, a second member having a surface of predetermined smoothness characteristics adapted to operate on the surface to be tested, oscillatory support means for one of said members and relatively fixed support means for the other of said members, a pendulum operatively connected with said oscillatory support means and swingable to a selected position, said pendulum being operable to oscillate said oscillatory support when released from said position, electrically actuated mechanism for recording the operation of said pendulum, said mechanism including a reel having a roll of tape thereon adapted for rotation to unwind the tape during operation of the mechanism and a stylus carried by said pendulum operating on said tape, and switch means operable incident to release of said pendulum from said position for effecting operation of said mechanism.

DAVID A. WALLACE.